Patented Dec. 8, 1942

2,304,335

UNITED STATES PATENT OFFICE

2,304,335

PROCESS FOR HEAT-SENSITIZING LATEX

Arthur W. Campbell, Terre Haute, Ind., assignor to Commercial Solvents Corporation, Terre Haute, Ind., a corporation of Maryland No Drawing. Application April 21, 1939, Serial No. 269,308

12 Claims. (Cl. 260—821)

My invention relates to a process for heat-sensitizing latex, which is particularly applicable in the utilization of latex for the production of molded or dipped articles.

Normal latex, and more especially concentrated latex, are widely employed for the production of rubber articles by molding or dipping processes, and for such purposes it is desirable to accelerate the rate at which the liquid latex solidifies into the desired solid form, in order to achieve production schedules which are commercially practicable. It has been found in the past that certain agents serve as heat-sensitizers for latex, and when present in a compounded latex such agents will accelerate the setting or gelling of the material at elevated temperatures. The materials thus far employed, however, have had certain disadvantages, particularly the property of leaving undesirable non-volatile residues in the products.

I have now discovered that nitrohydrocarbons and their volatile derivaties serve admirably as heat-sensitizers for latex, when incorporated in a compounded latex including certain metallic compounds which are normally employed in vulcanizing mixtures, or which may be added for the present purpose. These nitro compounds may be completely volatilized in vulcanizing the resulting products, and thus leave no undesirable non-volatile residues; and by proper choice of the nitro compound, and proper adjustment of the concentration of such material and of the coacting metallic compound, a wide range of control of the gelling time is available.

Any nitrohydrocarbon, or any nitrohydrocarbon derivative which may be volatilized at vulcanizing temperatures, can be employed in accordance with my process to accelerate the gelling of compounded latex, but there is naturally a relatively wide variation in the activity of these compounds. I have successfully employed the following materials to accelerate the gelling of a 60% latex composition containing the usual vulcanizing and compounding ingredients:

Nitromethane
Nitroethane
1-nitropropane
2-nitropropane
1-nitrobutane
2-nitrobutane
1-nitro-2-methylpropane
2-nitro-2-methylpropane
1-chloro-1-nitroethane
1,1-dichloro-1-nitroethane
1-chloro-1-nitropropane
1,1-dichloro-1-nitropropane
2-chloro-2-nitropropane
2-chloro-2-nitrobutane
1-chloro-1-nitro-2-methlylpropane
1,1-dichloro-1-nitro-2-methylpropane
1-chloro-1-nitrobutane
1,1-dichloro-1-nitrobutane
1-nitro-2-butanol
2-nitro-1-butanol
2-nitro-3-hexanol
3-nitro-2-hexanol
2-nitro-2-methyl-1,3-propanediol
2-nitro-2-ethyl-1,3-propanediol
2-nitro-2-(hydroxy-methyl)-1,3-propanediol
1-phenyl-1-nitroethane
Nitrobenzene
o-chloronitrobenzene
Alpha-nitronaphthalene The nitro compounds which I prefer to employ in my process comprise the lower saturated nitrohydrocarbons and their volatile derivatives, and particularly the nitroparaffins containing from 1 to 6 carbon atoms and the volatile mono- and di-substituted derivatives of the nitroparaffins containing from 1-6 carbon atoms.

Compounded latex, as commonly employed in the rubber industry for the production of molded or dipped products, contains in addition to latex a vulcanizing agent, such as sulfur or tellurium, a vulcanizing accelerator such as zinc dibutyl-dithiocarbamate, an activator such as zinc oxide, and may also contain anti-oxidants and various other common compounding ingredients. The nitrohydrocarbons and their volatile derivatives are active heat sensitizers when incorporated in compounded latex of this usual type, in which zinc oxide is employed as an activator. In the absence of zinc oxide, or an equivalent metallic compound to coact with the nitro compound, no appreciable heat sensitization is secured. It is thus necessary to employ the usual zinc oxide activator in the compounded latex, or to incorporate in its place another metallic compound to coact with the nitro compound.

The metallic compounds which are suitable for use in my process comprise the bases and salts of the divalent ions of the metals of group II, periods 2 to 6 inclusive, of the periodic table. As examples of the metallic compounds which I have successfully used, may be mentioned the following:

| | |
|---|---|
| Magnesium oxide | Zinc chloride |
| Magnesium sulfate | Zinc borate |
| Calcium oxide | Zinc acetate |
| Calcium nitrate | Zinc silicofluoride |
| Zinc oxide | Strontium oxide |
| Zinc carbonate | Cadmium oxide |
| Zinc nitrate | Barium hydroxide |
| Zinc sulfate | Barium nitrate |
| Zinc phosphate | Mercuric oxide |

Among these metals I prefer to utilize zinc, and among the various compounds of this group of metals I prefer to employ the oxides or hydroxides. Zinc oxide is most advantageous from the standpoint of efficiency, both as a vulcanization activator, and as the coacting metallic compound in the heat sensitization process. This material is therefore to be preferred for all normal uses, but may be eliminated in favor of one of the other metallic compounds of this group, for special purposes.

In compounding latex, it is the common practice to prepare a dispersion of the various compounding agents, and add this dispersion to the latex prior to the dipping or molding operation. In accordance with my invention, the zinc oxide or equivalent metallic compound may thus be incorporated in the latex. In the case of metallic compounds other than zinc compounds, this procedure is especially advantageous. Since the former compounds have a tendency to cause local coagulation when added in a dry state to concentrated latex, the introduction of the metallic compound in the form of a dispersion, together with the vulcanizing and other compounding agents, tends to inhibit this local coagulation, especially if a suitable dispersing agent is employed. For this purpose, any of the dispersing agents commonly utilized in the production of compounded latex, may be used, as, for example, the various sulfonated petroleum products.

After the introduction of the metallic compound and other compounding ingredients, the nitro compound may then be added to the compounded latex. In the case of the lower molecular weight compounds having appreciable water solubility, the nitro compound may be added directly to the compounded latex. In the case of materials having lower water solubility, however, it may be desirable to first form a dispersion or emulsion of the compound, preferably in aqueous ammonia, and add the material to compounded latex in this form. The resulting heat sensitized latex may then be poured into molds, or used to deposit films by dipping heated forms into the latex mixture. Temperatures for effecting the gelling, which are commonly employed in this art, may be utilized in conjunction with my invention. Thus, the heated forms may be maintained at a temperature of 50–80° C., or the material, after pouring into molds, may be heated to such temperatures to effect the gelling. In general, the higher the temperature, the more rapid will be the gelling, but too high temperatures are undesirable from the standpoint of volatilization of some of the components of the compounded latex, prior to or during the gelling.

Various modifications of the procedures discussed above may of course be employed, in accordance with prior practices. Thus, the nitro compound may be incorporated in the latex prior to the introduction of the coacting metallic compound. Likewise, instead of incorporating the nitro compound in the compounded latex, this material might be employed as a gelling bath into which heated forms are dipped following each dipping into compounded latex containing the other essential ingredients. In general, it may be said that any of the technics previously utilized in heat-sensitized latex processes, may readily be adapted to use in conjunction with my invention.

It should, of course, also be understood that my heat-sensitizing process is similar to prior processes of this nature, in that ultimate gel formation is secured even at ordinary atmospheric temperatures, and that the heat-sensitized latex, produced by my process, is thus not adapted for prolonged storage prior to utilization. A relatively wide range of gelling speeds at elevated temperatures is available when employing my process, and the time required for gelation at atmospheric temperature will be found to be roughly proportional to such speeds at elevated temperatures. The degree of heat-sensitization for any given purpose may therefore readily be determined in accordance with the production schedule desired.

I have found that the speed of gel formation of the compounded latex is dependent upon the concentration of each of the two coacting ingredients employed in my heat-sensitizing process. Increasing concentrations of the two active ingredients increase the speed of gel formation, but the actual concentration employed in any case will depend upon the activity of the particular ingredients chosen, and also, to some extent, upon the composition of the compounded latex employed. The effect of increasing concentrations may be illustrated by the following examples:

*Example I*

Zinc oxide was incorporated in concentrated latex (60%) in an amount approximately equal to 2% by weight of the rubber in the latex. Various amounts of nitroethane were added to separate quantities of the compounded latex, and the resulting mixtures were maintained at 50° C., for observation as to time of gel formation. The following results were secured:

| Concentration of nitroethane; percent by weight of rubber | Time of gel formation |
|---|---|
| 0.5 | No gelling in 72 hours. |
| 1.0 | 20 minutes. |
| 1.5 | 11 minutes. |
| 2.0 | 8 minutes. |
| 3.0 | Do. |
| 4.0 | 4 minutes. |

*Example II*

Nitroethane was incorporated in concentrated latex (60%) in a concentration of approximately 2% by weight, based on the weight of the rubber in the latex. Various amounts of zinc oxide were incorporated in separate portions of the compounded latex, and the resulting mixtures were maintained at 50° C. for observation of the time of gel formation. The following results were secured:

| Concentration of zinc oxide; percent by weight of rubber | Time of gel formation |
|---|---|
| 0.5 | No gelling in 48 hours. |
| 1.0 | 18 minutes. |
| 2.0 | 8 minutes. |

*Example III*

The process of Example II was followed, substituting various amounts of calcium oxide for the zinc oxide employed in the concentration. The following results were secured:

| Concentration of calcium oxide; percent by weight of rubber | Time of gel formation |
|---|---|
| 0.1 | No gelling in 48 hours. |
| 0.2 | 36 minutes. |
| 0.5 | 6 minutes. |
| 1.0 | Less than 1 minute. |

It may be seen from the above examples that calcium oxide is much more active than zinc oxide in equal concentrations. The higher activity of calcium oxide is not required for practical purposes, since normal concentrations of zinc oxide, employed as a vulcanization activator, are satisfactory for heat sensitizing to a degree suitable for normal production schedules. The greater activity of the calcium oxide may also be undesirable in tending to complicate the compounding operation, since it is sufficiently active to tend to produce local coagulation during incorporation into the latex.

In addition to the differences in activity of the various metallic compounds, the nitro compounds likewise differ to a marked degree in their activity in the heat sensitizing process. The differences between some of the most active compounds are illustrated by the following example in which the gelling agents are compared in a compounded latex of a commercial type, containing vulcanizing agents, accelerators, antioxidants, dispersing agents, and the like:

Example IV

Heat-sensitized latex mixtures were prepared from the following components:

| | Parts by weight |
|---|---|
| Concentrated latex (60%) | 167 |
| Normal compounding dispersion | 10.2 |
| Nitro compound | 2.0 |

The normal compounding dispersion had the following composition:

| | Parts by weight |
|---|---|
| Anti-oxidant: | |
| Di-beta-naphthyl-p-phenylenediamine | 1.0 |
| Accelerator: | |
| Zinc dibutyldithiocarbamate | 1.0 |
| Vulcanizing agents: | |
| Sulfur | 0.6 |
| Tellurium | 0.5 |
| Activator: | |
| Zinc oxide | 2.0 |
| Dispersing agent: | |
| Sulfonated petroleum product | 0.2 |
| Stabilizers: | |
| Casein | 0.15 |
| Sodium hydroxide | 0.1 |
| Water | 4.6 |

Separate mixtures were compounded in accordance with the above formulation, utilizing the various nitro compounds noted below, and the resulting mixtures were maintained at 80° C., for observation of the time of gelling. The following results were secured:

| Nitro compound | Time of gelling |
|---|---|
| | Minutes |
| Nitromethane | 4 |
| Do | 3 |
| 1-nitropropane | 3 |
| 2-nitropropane | 4 |
| 1-nitrobutane | 6 |
| 2-nitrobutane | 5 |
| 1-nitro-2-methylpropane | 5 |
| 2-nitro-2-methylpropane | 6 |
| 1-chloro-1-nitropropane | 4 |
| 2-chloro-2-nitropropane | 6 |
| 1-1-dichloro-1-nitropropane | 6 |

The following example illustrates the use of one of the most active heat-sensitizing agents in a commercial type of compounded latex having a different formulation from that employed in the preceding example:

Example V

To 167 parts of concentrated latex (60%) there was added 10.2 parts by weight of a compounding dispersion of the following composition:

| | Parts by weight |
|---|---|
| Di-beta-naphthyl-para-phenylenediamine | 1.0 |
| Benzothiazyl disulphide | 1.0 |
| Sulfur | 0.6 |
| Tellurium | 0.5 |
| Calcium oxide | 0.2 |
| Dispersing agent (sulfonated petroleum product) | 0.2 |
| Casein | 0.15 |
| Sodium hydroxide | 0.1 |
| Water | 6.25 |

The resulting compounded latex was divided into portions, to one of which 1 part by weight of nitroethane was added. The resulting mixtures were then maintained at 80° C., for observation of the gelling time. The following results were secured:

| Nitrohydrocarbon derivative | Gelling time |
|---|---|
| | Minutes |
| None | 109 |
| Nitroethane | 6 |

As may be seen from the above examples, the concentration of the heat-sensitizing agents to be employed in any given case will depend upon the activity of the particular agents used and the speed of gelling desired. With the preferred nitrated hydrocarbon derivatives specified above, concentrations of 1% to 5% based on the weight of the rubber in the latex will usually be satisfactory in conjunction with 1% to 3% of a zinc compound. Suitable concentrations of other agents, or for special gelling times, may of course be easily determined in any particular case by simple preliminary experiments.

It will be noted that in Examples IV and V above, the compounding dispersion contained dispersing agents and stabilizing agents. Such agents, of course, tend to prevent gel formation, but they are used in such low concentrations, based on the total latex composition, that they do not interfere with the heat-sensitizing effected by the nitro compound and metal compound. It is obvious, of course, that in any latex composition to which my heat-sensitizing process is to be applied, the concentration of dispersing agents and stabilizing agents should be maintained sufficiently low so that the heat-sensitizing activity of the nitro compound and metal compound is not prevented.

It is to be understood, of course, that the above examples are merely illustrative, and do not limit the scope of my invention. Various other compounding ingredients commonly employed in latex compositions may be substituted for those of the specific examples, and various modifications of procedure may be employed in accordance with known practices. In general, it may be said that the use of any equivalents or modifications of procedure, which would naturally occur to those skilled in the art, may be considered as included in the scope of my invention.

The term "latex" is used herein in the usual sense, signifying natural latex containing the usual preservatives, such as ammonium hydroxide. The term "latex composition," as used in the appended claims, signifies latex as defined above, and such latex containing any of the usual compounding ingredients.

My invention now having been described, what I claim is:

1. A process for heat-sensitizing a latex composition, which comprises incorporating therein a nitroparaffin containing from 1 to 6 carbon atoms, and a zinc compound, and maintaining the concentration of any dispersing agent in said composition sufficiently low so as not to prevent the heat-sensitizing action of said nitroparaffin and said zinc compound.

2. A process for heat-sensitizing a latex composition, which comprises incorporating therein a chloronitroparaffin containing from 1 to 6 carbon atoms, and a zinc compound, and maintaining the concentration of any dispersing agent in said composition sufficiently low so as not to prevent the heat-sensitizing action of said chloronitroparaffin and said zinc compound.

3. A process for heat-sensitizing a latex composition, which comprises incorporating therein a saturated nitroalcohol containing from 1 to 6 carbon atoms, and a zinc compound, and maintaining the concentration of any dispersing agent in said composition sufficiently low so as not to prevent the heat-sensitizing action of said nitro alcohol and said zinc compound.

4. A process for heat-sensitizing a latex composition, which comprises incorporating therein from 1 to 5% of a nitroparaffin containing from 1 to 6 carbon atoms, and from 1 to 3% of a zinc compound, based on the weight of the rubber in said latex, and maintaining the concentration of any dispersing agent in said composition sufficiently low so as not to prevent the heat-sensitizing action of said nitroparaffin and said zinc compound.

5. A process for heat-sensitizing a latex composition, which comprises incorporating therein approximately 2% of nitroethane and approximately 2% of zinc oxide, based on the weight of the rubber in said latex, and maintaining the concentration of any dispersing agent in said composition sufficiently low so as not to prevent the heat-sensitizing action of said nitroethane and said zinc oxide.

6. A process for heat-sensitizing a latex composition, which comprises incorporating therein a nitro compound selected from the group consisting of nitroparaffins, chloronitroparaffins, and saturated nitro alcohols, which may be volatilized at vulcanization temperatures, and a metal compound of a divalent metal of group II, periods 2 to 6 inclusive, of the periodic table, and maintaining the concentration of any dispersing agent or stabilizing agent in said composition sufficiently low so as not to prevent the heat-sensitizing action of said nitro compound and metal compound.

7. A process for heat-sensitizing a latex composition, which comprises incorporating therein a nitroparaffin which may be volatilized at vulcanization temperatures, and an oxide of a divalent metal of group II, periods 2 to 6 inclusive, of the periodic table, and maintaining the concentration of any dispersing or stabilizing agent in said composition sufficiently low so as not to prevent the heat-sensitizing action of said nitroparaffin and said oxide.

8. A process for heat-sensitizing a latex composition, which comprises incorporating therein a nitroparaffin which may be volatilized at vulcanization temperatures, and an hydroxide of a divalent metal of group II, periods 2 to 6 inclusive, of the periodic table, and maintaining the concentration of any dispersing or stabilizing agent in said composition sufficiently low so as not to prevent the heat-sensitizing action of said nitroparaffin and said hydroxide.

9. A process for heat-sensitizing a latex composition, which comprises incorporating therein a 1-nitroparaffin which may be volatilized at vulcanization temperatures, and an oxide of a divalent metal of group II, periods 2 to 6 inclusive, of the periodic table, and maintaining the concentration of any dispersing or stabilizing agent in said composition sufficiently low so as not to prevent the heat-sensitizing action of said 1-nitroparaffin and said oxide.

10. A process for heat-sensitizing a latex composition, which comprises incorporating therein a 1-nitroparaffin which may be volatilized at vulcanization temperatures, and an hydroxide of a divalent metal of group II, periods 2 to 6 inclusive, of the periodic table, and maintaining the concentration of any dispersing or stabilizing agent in said composition sufficiently low so as not to prevent the heat-sensitizing action of said 1-nitroparaffin and said hydroxide.

11. A process for heat-sensitizing a latex composition, which comprises incorporating therein a chloronitroparaffin which may be volatilized at vulcanization temperatures, and a metal compound of a divalent metal of group II, periods 2 to 6 inclusive, of the periodic table, and maintaining the concentration of any dispersing or stabilizing agent in said composition sufficiently low so as not to prevent the heat-sensitizing action of said chloronitroparaffin and metal compound.

12. A process for heat-sensitizing a latex composition, which comprises incorporating therein a saturated nitro alcohol which may be volatilized at vulcanization temperatures, and a metal compound of a divalent metal of group II, periods 2 to 6 inclusive, of the periodic table, and maintaining the concentration of any dispersing or stabilizing agent in said composition sufficiently low so as not to prevent the heat-sensitizing action of said saturated nitro alcohol and metal compound.

ARTHUR W. CAMPBELL.

CERTIFICATE OF CORRECTION.

Patent No. 2,304,335. December 8, 1942.

ARTHUR W. CAMPBELL.

It is hereby certified that error appears in the printed specification of the above numbered patent requiring correction as follows: Page 1, first column, line 60, for "methlylpropane" read --methylpropane--; page 3, first column, line 58, in the table, for "Do" read --Nitroethane--; and that the said Letters Patent should be read with this correction therein that the same may conform to the record of the case in the Patent Office.

Signed and sealed this 2nd day of February, A. D. 1943.

Henry Van Arsdale,
Acting Commissioner of Patents.

(Seal)